R. H. GERARD.
VARIABLE SPEED GEARING.
APPLICATION FILED OCT. 9, 1912.
1,079,852.
Patented Nov. 25, 1913.
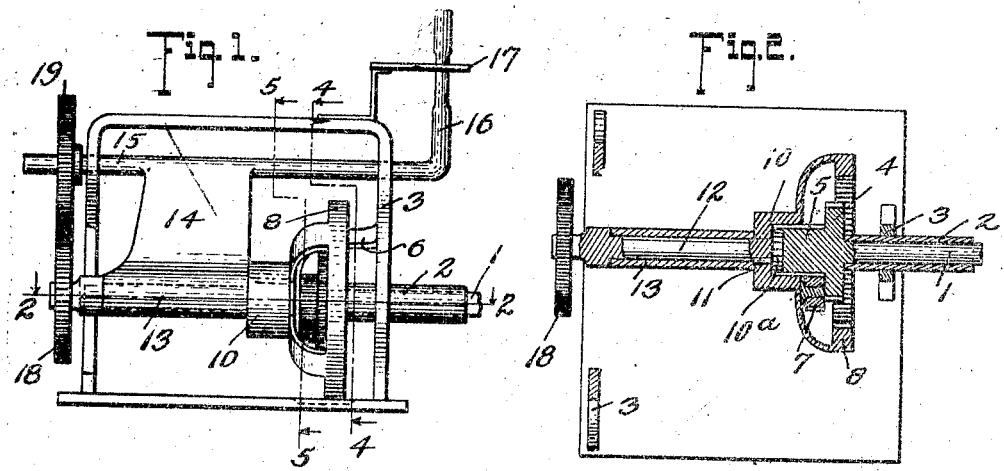
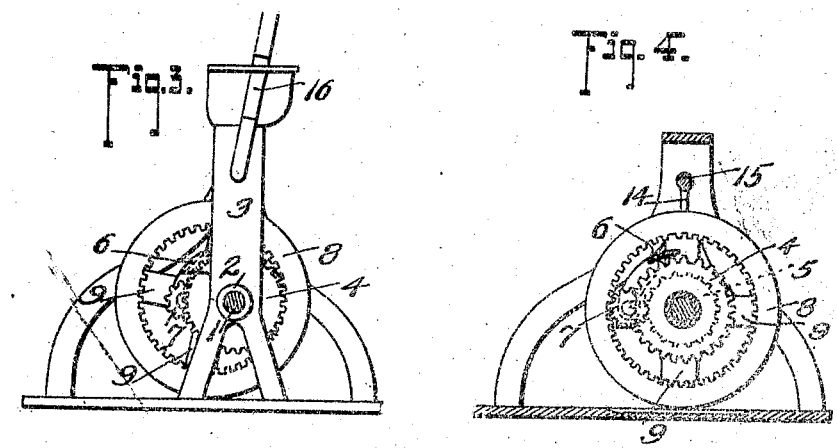
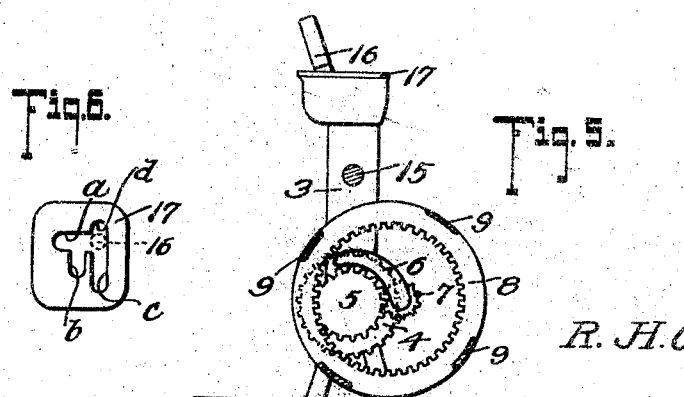
Inventor
R. H. Gerard
Witnesses
By Robert Robb
Attorney

UNITED STATES PATENT OFFICE.

ROY HANMORE GERARD, OF BERKELEY, CALIFORNIA.

VARIABLE-SPEED GEARING.

1,079,852.

Specification of Letters Patent. Patented Nov. 25, 1913.

Application filed October 9, 1912. Serial No. 724,839.

*To all whom it may concern:*

Be it known that I, ROY HANMORE GERARD, a citizen of the United States, residing at Berkeley, in the county of Alameda and State of California, have invented certain new and useful Improvements in Variable-Speed Gearing, of which the following is a specification.

This invention appertains to change speed gearing of the type designed especially for use in connection with motor vehicles.

Among the objects of the invention are to produce gearing of the above class in which a minimum number of gears are utilized, and wherein the gears are meshed face on with a maximum number of teeth interlocked, the arrangement and construction of the various parts of the gearing, including the operating means, being designed with a view to extreme simplicity. The present gearing eliminates the necessity of employing a countershaft, the driven member is very light, and wear, friction and noise are minimized in the practical operation of the parts.

In the accompanying drawings: Figure 1 is an elevation of a change speed gearing embodying essential features of the invention. Fig. 2 is a sectional view taken about on the line 2—2 of Fig. 1. Fig. 3 is an end view of the gearing, the parts being shown in the adjustment necessary for obtaining the second or intermediate speed. Figs. 4 and 5 are sectional views taken on the lines 4—4, and 5—5 respectively of Fig. 1, the former showing the adjustment of the gearing to reverse, and the latter showing the adjustment necessary in obtaining low speed.

Briefly, a mechanism embodying the invention comprises drive gears, a driving gear or gears, and means for effecting relative longitudinal and lateral movement of said gears whereby to obtain the necessary changes of speed. A single means is utilized to cause the relative movements of the gears, as above suggested, and may consist of a lever or equivalent device.

Describing the invention in detail, in the drawings 1 denote a drive shaft mounted in a suitable bearing 2 of the frame 3 and carrying the large gear 4 and the small gear 5. Projecting from the frame 3 is an arm 6 curving downwardly and terminating at one side of the gear 5. A reverse gear 7 is journaled on the lower end portion of the arm 6 and is normally in mesh with the small drive gear 5.

The driving means forming a part of the gearing includes a large driving gear 8 of ring-like form, being internally toothed and having outwardly and inwardly curving arms 9 connecting it with its hub 10. The hub 10 is keyed or otherwise secured, as shown at 11, to a driven shaft 12 which is mounted for rotation in a bearing 13 of the swinging carrier 14. The carrier 14 is connected for movement with an operating shaft 15 at one end of which is formed a lever 16. The lever 16 is provided with a handle at its upper end and passes through a locking plate 17, shown more clearly in Fig. 6 of the drawings. Suitable notches or slots $a$, $b$, $c$ and $d$ are provided in the plate 17 to govern the direction and extent of movement of the lever 16 when the latter movement of the carrier 14 to control the engaging and disengaging of the driven gearing in respect to the drive gearing. It may be noted, as shown in Fig. 2, that the hub 10 of the driven gear 8 is internally toothed, as shown at $10^a$, so as to provide a clutch.

A description of the operation of the invention will present quite clearly the advantages of the invention and the particular coöperation of the various elements of the gearing. Supposing that the lever 16 occupies the position shown in dotted lines in Fig. 6, in respect to the lock plate 17, no transmission of motion from the drive shaft 1 to the driven gearing will occur since none of the drive gears is meshed with a driven gear. To obtain the low speed, the lever will be moved to the right, as shown in Fig. 3, or toward the outer end of the slot $c$ of plate 17, thereby causing the driven gear 8 to be intermeshed with the small driving gear 5, as shown in Fig. 5. If the lever 16 be now moved in an opposite direction to engage in the slot $d$ the reverse gear 7 will mesh with the driven gear 8 and the reverse speed produced. Except when it is engaged with the gear 8, the reverse gear 7 operates purely as an idler, rotating in mesh with the gear 5 while the drive gears are in operation. In producing the reverse and low speeds as above described, the lever 16 is moved to swing the carrier 14 and the gear parts mounted thereon. Now to secure the intermediate speed, the lever 16 is moved into the slot $b$ of the plate 17, such movement being caused by an initial longitudinal movement of the shaft 15 carrying the lever 16 into the slot $a$, and a subsequent swinging movement of the shaft 15 engaging the lever in the slot $b$, corresponding longitudinal and lateral movements being imparted to the carrier 14 and driven gearing supported thereon. The longitudinal movement of the shaft 15 just mentioned, carries the large driven gear 8 into the same plane as that including the large driving gear 4, and the subsequent lateral movement of the gear 8 intermeshes it with the gear 4, thereby producing the intermediate speed. To secure the high or direct speed, assuming that the parts be at the adjustment for the intermediate speed, the lever 16 is thrown out of the slot $b$ into the slot $a$ and moved to the outer extremity of said slot $a$. In other words, the above movement of the lever 16 causes the gear 8 to be swung by the carrier 14 out of engagement with respect to the gear 4, and then causes the gear 8 to be moved longitudinally with the carrier 14 until the small drive gear 5 enters the hollow toothed portion of the hub 10 of the gear 8. In this manner the gear 5 directly connects the shaft 1 with the shaft 12.

It is obvious that any suitable provision may be made for transmitting motion from the driven shaft 12 to a suitable point of utilization. This means, in the ordinary motor vehicle, would comprise the connection between the transmission gearing and the rear axle of the vehicle. For this purpose a flexible shaft might be coupled direct to the driven shaft 12 or, as shown in the drawings, a transmission gear 18 is keyed to the shaft 12 and in mesh with a coöperating gear 19 loosely mounted on the end of the shaft 15 opposite the lever 16. I do not wish to be limited, however, to the means comprising the gears 18 and 19, or in fact to any means whatever, for transmitting power from the driven shaft.

It is to be understood further that the terms driving, drive and driven as used herein are relative, as it is within the purview of the invention that those parts designated driven parts may, in fact, be the driving parts, under which conditions the gearing illustrated as the drive gearing would be the driven gearing. Furthermore, a catch will be carried by the lever 16 to engage the plate 17 and thereby hold the lever at predetermined adjustments in the various slots $a$, $b$, $c$, $d$ of said plate.

Having thus described the invention, what is claimed as new is:

1. In variable speed gearing, the combination of a rock shaft, an operating lever for rocking said shaft, and for moving it longitudinally, an internally toothed gear supported by said rock shaft for lateral and axial movements on the rocking and longitudinal movements respectively of said shaft, said gear having a clutch element concentric therewith, a second shaft coaxial with respect to said gear, and gears of different diameters on said second shaft adapted to coöperate with the internal gear, and one of which is engageable with the clutch element.

2. In combination, a support, a drive shaft, a plurality of drive gears carried by said drive shaft, a rock shaft mounted in said support in parallel relation to the drive shaft, a lever for rocking and moving said rock shaft longitudinally, a carrier operable by the rock shaft and having a bearing therein, a driven shaft supported in said bearing of the carrier, a gear and a clutch element connected with said driven shaft, longitudinal movement of the driven shaft under actuation of the rock shaft being adapted to cause engagement with the clutch element and one of the drive gears, while lateral movement of the driven shaft by the rock shaft will cause engagement of either drive gear with the gear of the driven shaft.

3. In variable speed gearing, the combination of a drive shaft, driving gears of different diameters carried thereby, a reverse gear normally meshing with one of said drive gears and operating as an idler, a driven shaft, a driven gear carried by said driven shaft, an operating shaft, a carrier operable thereby and supporting the driven shaft, and a lever for actuating the operating shaft to cause longitudinal and lateral movement of the carrier and impart corresponding movements to the driven gear to control meshing of the latter with the drive and reverse gears aforesaid.

4. In variable speed gearing, the combination of a frame, a drive shaft mounted thereon, drive gears carried by said shaft, a driven shaft, a driven gear carried by said shaft, a reversing gear arranged intermediate certain of the drive and driven gears, a lever, and means intermediate said lever and the driven shaft for imparting longitudinal and lateral movement to the latter, whereby to engage and disengage the drive and driven gears and reverse gear.

In testimony whereof I affix my signature in presence of two witnesses.

ROY HANMORE GERARD.

Witnesses:
MARY H. GERARD,
FERD H. MEYER.